US012683385B2

(12) United States Patent
Godbold

(10) Patent No.: US 12,683,385 B2
(45) Date of Patent: Jul. 14, 2026

(54) ELECTRICAL DAMPING DEVICE FOR A DC VOLTAGE BUS

(71) Applicant: Deere & Company, Moline, IL (US)

(72) Inventor: Clement Vanden Godbold, Cary, NC (US)

(73) Assignee: Deere & Company, Moline, IL (US)

( * ) Notice: Subject to any disclaimer, the term of this patent is extended or adjusted under 35 U.S.C. 154(b) by 202 days.

(21) Appl. No.: 18/647,055

(22) Filed: Apr. 26, 2024

(65) Prior Publication Data

US 2025/0174983 A1     May 29, 2025

Related U.S. Application Data

(60) Provisional application No. 63/602,795, filed on Nov. 27, 2023.

(51) Int. Cl.
H02H 9/00 (2006.01)

(52) U.S. Cl.
CPC .................................... H02H 9/007 (2013.01)

(58) Field of Classification Search
CPC ........... H02H 9/007; H02M 1/123; H02J 1/02
See application file for complete search history.

(56) References Cited

U.S. PATENT DOCUMENTS 3,602,329 A * 8/1971 Bauer ....................... A42B 3/16
                                                    181/129
3,795,855 A * 3/1974 Browning .............. G01N 24/08
                                                    324/322

(Continued)

FOREIGN PATENT DOCUMENTS

CA          1003057 A       1/1977
CN          1841894 A       10/2006

(Continued)

OTHER PUBLICATIONS

S. C. Tang et al., Coreless Planar Printed-Circuit-Board (PCB) Transformers—A Fundamental Concept for Signal and Energy Transfer, IEEE Transactions on Power Electronics, vol. 15, No. 5, Sep. 2000, pp. 931-941.

(Continued)

*Primary Examiner* — Thienvu V Tran
*Assistant Examiner* — Muaamar Qahtan Al-Taweel
(74) *Attorney, Agent, or Firm* — Taft Stettinius & Hollister LLP; Stephen F. Rost

(57) ABSTRACT

An electrical damping device comprises a positive path that comprises a first resistive-inductive (RL) network in parallel with a second RL network, wherein the positive path is coupled between the positive terminals of the DC ports. A negative path comprises a third RL network in parallel with a fourth RL network, wherein the negative path is coupled between the negative terminals of the DC ports. A first transformer is defined by a first inductance of first RL network and a third inductance of the third RL network, wherein the first transformer comprises windings arranged for mutual coupling between the positive path and the negative path. A second transformer is defined by a second inductance of the second RL network and a fourth inductance of the fourth RL network, wherein the second transformer comprises windings arranged for mutual coupling between the positive path and the negative path.

20 Claims, 4 Drawing Sheets

(56) References Cited

U.S. PATENT DOCUMENTS

| | | | | |
|---|---|---|---|---|
| 4,685,041 | A * | 8/1987 | Bowman | H02M 3/28 |
| | | | | 363/40 |
| 4,713,742 | A | 12/1987 | Parsley | |
| 6,335,643 | B1 * | 1/2002 | Ono | G11B 5/02 |
| | | | | 327/108 |
| 7,596,006 | B1 | 9/2009 | Granat | |
| 10,523,108 | B1 | 12/2019 | Godbold et al. | |
| 2003/0008593 | A1 * | 1/2003 | Hageluken | H01J 9/39 |
| | | | | 445/19 |
| 2005/0040800 | A1 | 2/2005 | Sutardja | |
| 2005/0073863 | A1 | 4/2005 | De Rooij et al. | |
| 2009/0224735 | A1 * | 9/2009 | Tsutsumi | H02M 1/12 |
| | | | | 323/273 |
| 2012/0275201 | A1 * | 11/2012 | Koyama | H02M 7/48 |
| | | | | 363/40 |
| 2014/0133189 | A1 * | 5/2014 | Worek | H02M 3/33507 |
| | | | | 363/21.02 |
| 2014/0177294 | A1 * | 6/2014 | Lindholm | H02M 1/14 |
| | | | | 363/39 |
| 2017/0085189 | A1 | 3/2017 | Madsen | |

FOREIGN PATENT DOCUMENTS

| | | | |
|---|---|---|---|
| CN | 105052025 | A | 11/2015 |
| CN | 112352383 | A | 2/2021 |
| CN | 116114156 | A | 5/2023 |
| EP | 3926805 | A1 | 12/2021 |

OTHER PUBLICATIONS

Xun Liu et al., An Integrated Planar EMI Filter for Ultra-high Frequency Power Converters, pp. 1528-1534.

Balasubramanian et al., Analysis and design of split-capacitor resistive-inductive passive damping for LCL filters in grid-connected inverters, Apr. 28, 2013, IET Power Electron., 2013, vol. 6, Iss. 9, pp. 1822-1832, doi: 10.1049/iet-pel.2012.0679.

5200 Series-Hash Choke, pp. 1-3.

Basic Knowledge of LC Filters, May 26, 2020, pp. 1-7, [online]. Retrieved from the Internet <URL: https://industrial.panasonic.com/ww/ss/technical/b4>.

EMC self-study course, Elmac Services, 1 page, [online]. Retrieved from the Internet <URL: http://www.elmac.co.uk/EMC_SelfStudy-std/Index.htm?context=490>.

Extended European Search Report and Written Opinion issued in European Patent Application No. 24190406.9 dated Apr. 14, 2025, in 07 pages.

Liu He et al., Novel integrated coupled inductor boost with RL parallel damping network for improving dynamic response, Journal of Power Electronics, vol. 23, No. 11, Jul. 4, 2023, pp. 1630-1642, XP093266646, ISSN: 1598-2092, DOI: 10.1007/s43236-023-00670-8. Retrieved from URL:https://link.springer.com/article/10.1007/s43236-023-00670-8/fulltext.html on Apr. 3, 2025.

* cited by examiner

ELECTRICAL DAMPING DEVICE FOR A DC VOLTAGE BUS

RELATED APPLICATION

This document (including the drawings) claims priority and the benefit of the filing date based on U.S. provisional application No. 63/602,795, filed Nov. 27, 2023, under 35 U.S.C. § 119 (e), where the provisional application is hereby incorporated by reference herein.

FIELD

This disclosure relates to an electrical damping device for a direct current (DC) voltage bus.

BACKGROUND

In some prior art, two or more electrical devices may be coupled to a common direct current voltage bus via transmission line or via transmission line with inductances, such as integral inductances inherent to the transmission line. The direct current voltage bus typically has capacitors to reduce alternating current ripple. The capacitors in combination with the inductances can produce a resonance or unwanted oscillation about a resonant frequency that can potentially exceed target design currents or design voltages on the DC voltage bus; hence, result in potential damage to the transmission line, connectors, or other electrical components. Accordingly, there is a need for an electrical damping device for a DC voltage bus.

SUMMARY

In accordance with one aspect of the disclosure, an electrical damping device is configured to reduce resonance for devices that are coupled to a direct current (DC) voltage bus, where the DC voltage bus comprises a first set of DC ports and a second set of DC ports. The first set of DC ports has a first capacitance in parallel with a positive terminal and a negative terminal of the DC ports. The second set of DC ports has a second capacitance in parallel with a positive terminal and a negative terminal of the DC ports.

In accordance with another aspect of the disclosure, the electrical damping device comprises a positive path that comprises a first resistive-inductive (RL) network in parallel with a second RL network, wherein the positive path is coupled between the positive terminals of the DC ports. Further, the electrical damping device comprises a negative path comprises a third RL network in parallel with a fourth RL network, wherein the negative path is coupled between the negative terminals of the DC ports. A first transformer is defined by a first inductance of first RL network and a third inductance of the third RL network, wherein the first transformer comprises windings arranged for mutual coupling between the positive path and the negative path. A second transformer is defined by a second inductance of the second RL network and a fourth inductance of the fourth RL network, wherein the second transformer comprises windings arranged for mutual coupling between the positive path and the negative path.

DETAILED DESCRIPTION

Figure 1A:
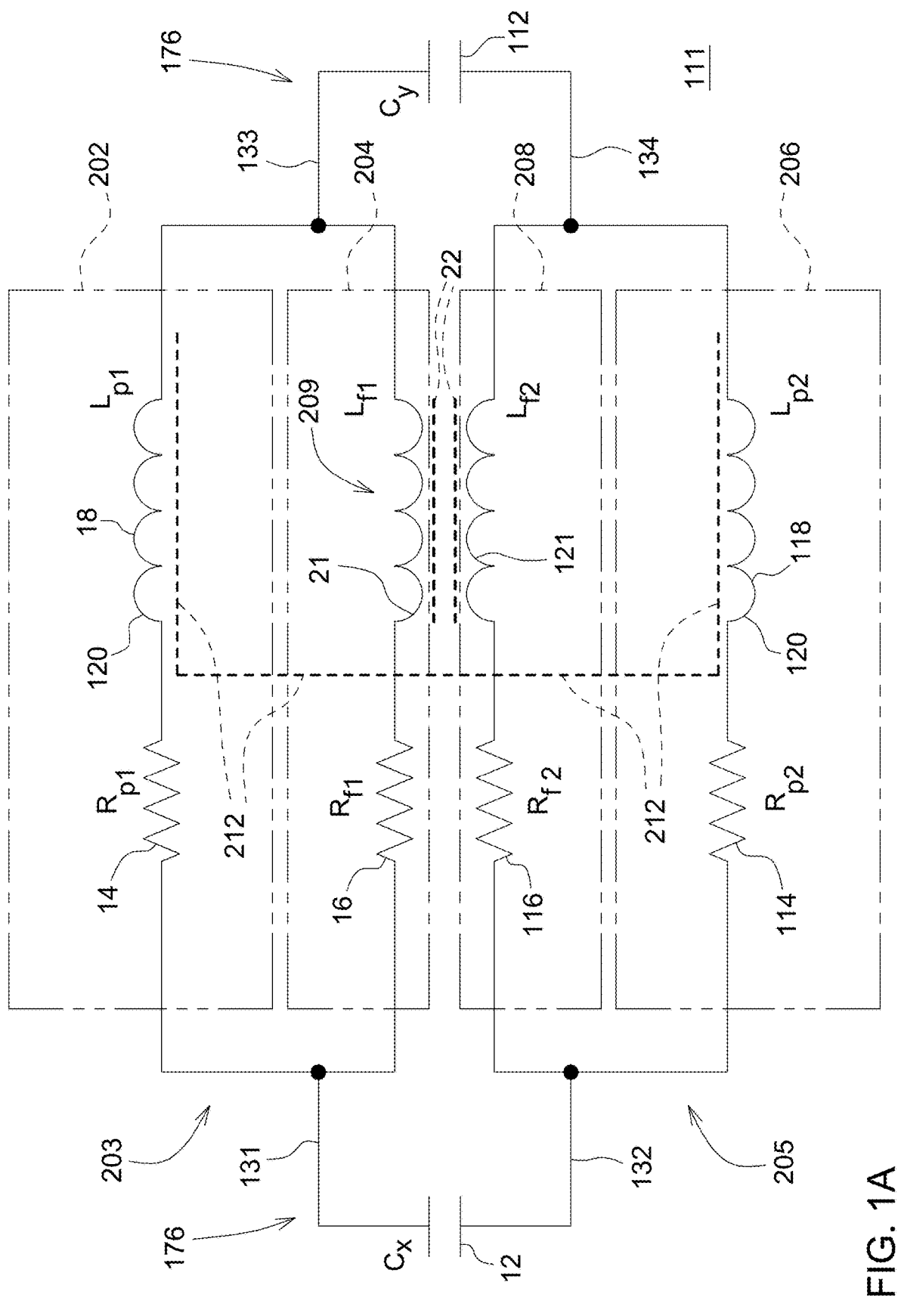
FIG. 1A is one embodiment of an illustrative schematic of an electrical damping device for reducing resonance for devices (e.g., capacitors) that are coupled to a direct current voltage bus.
Figure 1B:
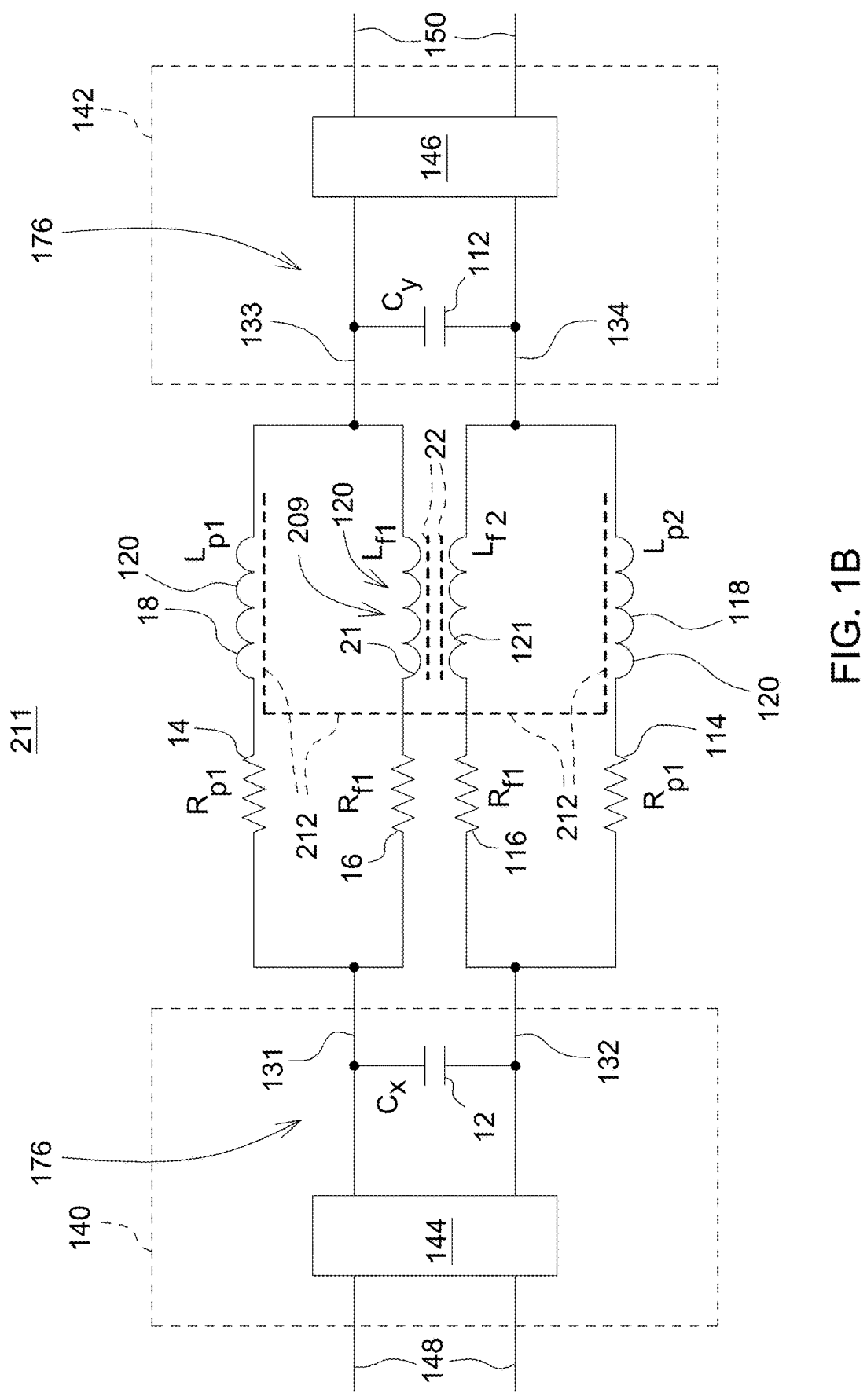
FIG. 1B is one embodiment of an illustrative schematic of an electrical damping device for reducing resonance for devices (e.g., DC-DC converters) that are coupled to a direct current (DC) voltage bus.

In accordance with one aspect of the disclosure as illustrated in FIG. 1A and FIG. 1B, an electrical damping device (111, 211) is configured to reduce resonance for electronic devices (144, 146) that are coupled to a direct current (DC) voltage bus 176, where the DC voltage bus 176 comprises a first set of DC ports (131, 132) and a second set of DC ports (133, 134). The first set of DC ports (131, 132) has a first capacitance 12 (Cx) in parallel with a positive terminal 131 and a negative terminal 132 of the DC ports. The second set of DC ports has a second capacitance 112 (Cy) in parallel with the DC ports with a positive terminal 133 and a negative terminal 134 of the DC ports. For example, the first capacitance 12 may comprise a first capacitor, a network of capacitors, an ultra-capacitor, a super capacitor, or capacitor bank; similarly, the second capacitance 112 may comprise a second capacitor, a network capacitors, an ultra-capacitor, a super capacitor, or a capacitor bank. As used in this document, a DC bus terminal is synonymous with a DC port. Each DC port represents a terminal.

The blocks of the positive (electrical) path 203 and the negative (electrical) path 205 are illustrated as dashed lines in FIG. 1A and FIG. 1B. In accordance with another aspect of the disclosure, the electrical damping device (111, 211) comprises a positive path 203 that comprises a first resistive-inductive (RL) network 202 (e.g., first power path) in parallel with a second RL network 204 (e.g., first damping path), wherein the positive path 203 is coupled between the positive terminals (131, 133) of the DC ports. A negative path 205 comprises a third RL network 206 (e.g., second damping path) in parallel with a fourth RL network 208 (e.g., second power path), wherein the negative path 205 is coupled between the negative terminals (132, 134) of the DC ports.

A first transformer 120 is defined by a first inductance 18 (Lp1) of first RL network 202 and a third inductance 118 (Lp2) of the third RL network 206, wherein the first transformer 120 comprises windings arranged for mutual coupling between the positive path 203 and the negative path 205. A second transformer 209 is defined by a second inductance 21 (Lf1) of the second RL network 204 and a fourth inductance 121 (Lf2) of the fourth RL network 208, wherein the second transformer 209 comprises windings arranged for mutual coupling between the positive path 203 and the negative path 205.

In practice, electronic devices (144, 146) are coupled to the DC ports (131, 132, 133, 134), such as DC-DC converters, inverters, or power electronics, where each electronic device may have semiconductor switches that are switched at a fundamental frequency. During the operation of the semiconductor switches, alternating current noise or ripple, or other stimulus signal is produced at one or more stimulus signal frequencies, such as the fundamental switching frequency or harmonics thereof. For example, a first electronic device 144 (in FIG. 1B) outputs a first stimulus signal that is modeled as an alternating current source in parallel with the first capacitance 12, whereas the second electronic device 146 outputs a second stimulus signal that is modeled as an alternating current course in parallel with the second capacitance 112. The first capacitance 12 and the second capacitance 112 can suppress some ripple or noise.

In some configurations, as best illustrated in FIG. 1B, a first electronic system 140 may comprise the first electronic device 144 that is coupled to the first capacitance 12, where the first electronic system may have additional input or output terminals 148 for direct current signals (e.g., at a different DC voltage level than DC voltage bus 176) or alternating current (AC) signals. In some configurations, a second electronic system 142 may comprise the second electronic device 146 that is coupled to the second capacitance 112, where the first electronic system may have additional input or output terminals 150 for direct current signals (e.g., at a different DC voltage level than DC voltage bus 176) or alternating current (AC) signals.

Without one or more damping resistors, the impedance of the DC voltage bus 176 (e.g., DC voltage bus connection) can be dominated by inductance of transmission lines that connect the devices (144, 146) or systems (140, 142) to the DC voltage bus 176. In one embodiment that is consistent with FIG. 1A, the first RL network 202 may comprise a first transmission line where the first inductance 18 (Lp1) may comprise an integral inductance of the first transmission line (e.g., and winding of the first transformer 120) and where the first resistance 14 (Rp1) comprises a discrete resistor; the second RL network 204 may comprise a second transmission line where the second inductance 21 (Lf1) may comprise an integral inductance of the second transmission line (e.g., and winding of the first transformer 120) and where the second resistance 16 (Rf1) comprises a discrete resistor; the third RL network 206 may comprise a third transmission line where the third inductance 118 (Lp2) may comprise an integral inductance of the third transmission line (e.g., and winding of the second transformer 209) and where the third resistance 114 (Rp2) comprises a discrete resistor; the fourth RL network 208 may comprise a fourth transmission line where the fourth inductance 121 (Lf2) may comprise an integral inductance of the fourth transmission line (e.g., and winding of the second transformer 209) and where the fourth resistance 116 (Rf2) comprises a discrete resistor. In one embodiment, the above discrete resistors are selected to dampen, attenuate, or reduce the potential resonance that might or would otherwise occur at one or more resonant frequencies, given the combination of the inductance of one or more transmission lines (e.g., along with the windings of the first transformer 120), the first capacitance 12, and the second capacitance 112 that are exposed to a stimulus signal (e.g., in a parallel with the first capacitance 12, the second capacitance 112, or both).

In an alternate embodiment, any integral inductance may be modeled as a combination of a series resistance and integral series inductance or as a parallel combination of resistance and an integral inductance. For example, if the DC voltage bus 176 is considered at DC or zero Hertz, the DC the inductances provide zero reactance and the inductance can generally be modeled as a low resistance.

To the extent that each transmission line, such as the first, second, third or fourth transmission line, can be modeled as parallel resonant circuit that is dominated by inductance, a potential resonance can occur at the frequency where the reactance of one or both capacitances (12, 112; e.g., capacitors) equals the inductance (e.g., of the transmission line) or where the impedance of the parallel circuit is at a maximum, or both, among other possibilities. If the frequency range of first stimulus signal or second stimulus signal is aligned with a potential resonant frequency of any transmission line (e.g., or its inductance) between the DC ports (131, 132, 133, 134), a resonant alternating current may support excessive voltage fluctuations that can even cause heating of the transmission line and its terminals.

Accordingly, the electrical damping device (111, 211) be configured by selection of one or more of the following components: (1) adding one or more discrete resistors or resistances in the transmission line to dampen or counteract the potential resonance (e.g., associated with the transmission line or its inductance, alone or together with the winding inductance of the transformer, 120, 209) subject to the stimulus signal within a known frequency range, (2) changing or adding one or more discrete inductors to shift the resonant frequency (e.g., natural resonant frequency of the transmission line) to be misaligned with the frequency range of the stimulus signal, (3) allowing some alternating current power to flow in the transmission line at low frequency band (e.g., below a potential prior resonant frequency) from a shift in the resonant frequency to be misaligned with the frequency range of the stimulus signal; and/or (4) introducing mutual coupling between the positive and negative paths of the transmission lines, via the transformer (120, 209) to cancel out or attenuate the potential resonance, where the mutual coupling can be tailored by adjusting the core material, the relative direction of the primary and secondary windings, and the ratio of turns between the primary and secondary windings, among other things.

If the first transformer 120 has a first core 212, such as an iron core, a laminated iron core, a powdered iron core or a ferrite core, the first core 212 may be a generally E-shaped core, a generally U-shaped core, a substantially toroidal core, a substantially cylindrical core, or a substantially rectangular core, for example. If the second transformer 209 has a second core 22, such as an iron core, a laminated iron core, a powdered iron core or a ferrite core, the second core 22 may be a generally E-shaped core, a generally U-shaped core, a substantially toroidal core, a substantially cylindrical core, or a substantially rectangular core, where the second core 22 is spatially separated from the first core 212; hence, the second core 22 may be configured, alone or in conjunction with its windings, to be isolated electromagnetically from the first core 212 to minimize electromagnetic coupling or mutual coupling between the first core 212 and the second core 22, and their respective windings. As used throughout this document, approximately, substantially, generally or about shall mean a tolerance or variation of plus or minus (approximately) ten percent: (a) in mechanical dimensions, angles, shapes, faces, sides or values from or with respect to an ideal or model geometric representation; and/or (b) for electrical, electronic, electromagnetic, or thermal properties, characteristics parameters, or values from or with respect to an ideal configuration or model representation.

At AC frequencies, one or more damping resistors, which can be placed in series or parallel to the inductance (e.g., of the transmission line in the second RL network 204 and/or the fourth RL network 208) will experience voltage across its terminals, where the damping resistor can convert current into heat to dampen the potential resonance. Because the capacitors (e.g., DC link capacitors), which embody capacitances (12, 112), are susceptible to thermal damage, the one or more damping resistors (e.g., 16, 116) each comprise a power resistor that is thermally and physically isolated from the capacitor (12, 112) to avoid transfer of thermal energy to the capacitor(s) (12, 112) or thermal bridging.

If one or more additional discrete inductor (e.g., ballasting inductor or ballasting winding of transformer, 120, 209) is added to the transmission line between the DC terminals (131, 132, 133, 134) (e.g., within the first RL network 202 or the third RL network 206), the additional discrete inductor (e.g., added in series or parallel to first inductance 18 and/or third inductance 118) can shift the resonant frequency to a lower frequency where the stimulus signal for resonance is low or does not support resonance. The additional discrete inductor (e.g., added to 18, and/or 118) may be configured as an air-core inductor or winding on a suitable heat-sinking core (22, 212) to enhance thermal dissipation.

In the positive path 203, the first RL network 202 and the second RL network 204 are connected to each DC link capacitor (12, 112) by connectors with sufficient current capacity and thermal dissipation.

Further, in some embodiments, each DC capacitor (12, 112) may be mechanically and electrically connected to the connectors, but thermally isolated by a conductor configuration (e.g., an extended conductor path of minimal length, a conductive path with a thermal fuse or thermal circuit breaker, or conductive path composed of a conductive adhesive with reduced thermal conductivity).

In the negative path 205, the third RL network 206 and the fourth RL network 208 are connected to each DC link capacitor (12, 112) by connectors with sufficient current capacity and thermal dissipation. Further, the DC capacitor (12, 112) may be mechanically and electrically connected to the connectors, but thermally isolated by a conductor configuration (e.g., an extended conductor path of minimal length, a conductive path with a thermal fuse or thermal circuit breaker, or a conductive path composed of a conductive adhesive with reduced thermal conductivity).

As illustrated in FIG. 1A and FIG. 1B, the first RL network 202 has a first resistance 14 (Rp1) and first inductance 18 (Lp1); the second RL network 204 has a second resistance 16 (Rf1) and a second inductance 21 (Lf1); wherein the first inductance 18 (Lp1) 18 is greater than the second inductance 21 (Lf1); and wherein the first resistance 14 (Rp1) is lower than the second resistance 16 (Rf1); and wherein the second resistance 16 is configured to attenuate resonance in a LC or RLC combination in the positive path 203. For example, in some configurations the second resistance 16 (Rf1) is configured to attenuate a resonant magnitude of: (1) a combination of the first capacitance 12, the first inductance 18 Lp1, and the second capacitance 112, or (2) a combination of the first inductance 18 and the first capacitance 12 or the second capacitance 112, or (3) a combination of the first inductance 18, the second inductance 21, the first capacitance 12 and the second capacitance 112.

For example, in one illustrative embodiment, the second resistance 16 (Rf1) has a resistance (e.g., which can be expressed in Ohms or Kilohms) that is equal to or less than a threshold (parallel resistance) for damping the resonance associated with the following components (e.g., LC or RLC combinations): (1) the first inductance 18 (Lp1), the first capacitance 12, and the second capacitance 12, (2) the first inductance 18 (Lp1) and the first capacitance 12 or the second capacitance 12, or (3) the first inductance 18 (Lp1), the second inductance 21 (Lf1), the first capacitance 12, and the second capacitance 112, or (4) the first inductance 18 (Lp1), the second inductance 21 (Lf1), the first capacitance 12 or the second capacitance 112, or (5) the second inductance 21 (Lf1), and the first capacitance 12 and the second capacitance 112, or (6) the second inductance 21 (Lf1), and the first capacitance 12 or the second capacitance 112. Note that the equal-to-or-less-than threshold (of parallel resistance) applies to the parallel resistance value of a potential parallel resonant circuit, as opposed to a series resonant circuit equivalent where higher resistances are used to dampen a potential series resonant circuit; hence, for an equivalent series resonant circuit the equal-to-or-greater-than threshold (of series resistance) can apply for damping resistances to dampen potential resonance.

As indicated in FIG. 1A and FIG. 1B, $R_{f1}$ is the second resistance 16, $L_{p1}$ is the first inductance 18, Cx is the first capacitance 12, and Cy is the second capacitance 112. Within a resonant frequency range in the absence of the second resistance 16 (Rf1) is equal to or less than a threshold (parallel resistance), a maximum alternating current (e.g., an exaggerated maximum AC current) can resonate or oscillate in a resonant circuit, such as a combination (e.g., LC, inductor-capacitor combination) of an inductance and capacitor or the combination (e.g., RLC, resistor-inductor-capacitor combination) of a resistor, inductance and capacitor in response to an stimulus signal or an (exciting) ripple current or other stray alternating current input signal on the DC bus. In some embodiments of FIG. 1A and FIG. 1B, a stimulus signal is, in effect, applied in parallel across the terminals of the first capacitance 12 or the second capacitance 112, or stimulus signals are applied in parallel 12 across the terminals of both the first capacitance 12 and the second capacitance 112 to excite potential oscillation or resonance of the LC or RLC combination (e.g., parallel LC or parallel RLC combination), which can be damped by the appropriate selection of a (discrete) damping resistor (e.g., 16, 116).

Although any alternating current drawn from the DC voltage bus 176 is lower at a corresponding greater impedance of parallel resonant circuit (e.g. LC or RLC combination) within a resonant frequency range, a significant circulating alternating current can resonate or oscillate in a parallel resonance circuit (LC or RLC) in response to a stimulus signal, an (exciting) ripple current or other stray alternating current input signal on the DC voltage bus 176; hence, such material circulating current can be reduced or damped by setting, adjusting, or increasing the resistance value (e.g., second resistance 16 (Rf1)) of one or more resistors in a parallel resonant circuit (e.g., to a damping resistance that is equal to or less than a threshold (parallel resistance)). A significant circulating current means a material circulating current between the capacitor and inductor of the parallel resonant circuit, which circulating current is greater than the current drawn from the DC voltage bus 176. In contrast, if a respective parallel resonant circuit is modeled a series resonant circuit, such as an equivalent series resonant circuit, the current of the equivalent series resonant circuit (e.g., LC or RLC) is highest at resonance; the resistance for damping an equivalent series resonant circuit will generally increase (with respect to resonance resistance) to dampen resonance (e.g., where damping resistance for the series resonant circuit is greater than or equal to a damping threshold (of a series resistance)).

Further, the third RL network 206 has a third resistance 114 (Rp2) and third inductance 118 (Lp2); the fourth RL network 208 has a fourth resistance 116 (Rf2) and a fourth inductance 121 (Lf2); where the third inductance 118 (Lp2) is greater than the fourth inductance 121 (Lf2); wherein the third resistance 114 (Rp2) is lower than the fourth resistance 116 (Rf2), where the fourth resistance 116 (Rf2) 116 is configured to attenuate a resonant magnitude of an LC or RLC combination in the negative path 205. For example, in some configurations the fourth resistance 116 (Rf2) is configured to attenuate a resonant magnitude of: (1) a combination of the first capacitance 12, the third inductance 118 Lp2, and the second capacitance 112, or (2) a combination of the third inductance 118 and the first capacitance 12 or the second capacitance 112, or (3) a combination of the third inductance 118, the fourth inductance 121, the first capacitance 12 and the second capacitance 112.

For example, in one illustrative embodiment, the fourth resistance 116 (Rf2) has a resistance (e.g., which can be expressed in Ohms or Kilohms) that is equal to or less than a threshold (parallel resistance) for damping the resonance associated with any of the following (e.g., LC or RLC combinations): (1) the third inductance 118 (Lp2), the first capacitance 12, and the second capacitance 12, (2) the third inductance 118 (Lp1) and the first capacitance 12 or the second capacitance 12, or (3) the third inductance 118 (Lp2), the fourth inductance 121 (Lf2), the first capacitance 12, and the second capacitance 112, or (4) the third inductance 118 (Lp2), the fourth inductance 121 (Lf2), the first capacitance 12 or the second capacitance 112, or (5) the fourth inductance 121 (Lf2), and the first capacitance 12 and the second capacitance 112, or (6) the fourth inductance 121 (Lf2), and the first capacitance 12 or the second capacitance 112.

In FIG. 1A and FIG. 1B, $R_{f2}$ is the fourth resistance 116 (Rf2); $L_{p2}$ is the third inductance 118; Cx is the first capacitance 12 and Cy is the second capacitance 112. Within a resonant frequency range in the absence of the fourth resistance 116 (Rf2) equal to or less than a threshold (parallel resistance), a maximum alternating current (e.g., an exaggerated maximum AC current) can resonate or oscillate in a resonant circuit, such as a combination (e.g., LC, inductor-capacitor combination) of an inductance and capacitor or the combination (e.g., RLC, resistor-inductor-capacitor combination) of a resistor, inductance and capacitor in response to an stimulus signal or an (exciting) ripple current or other stray alternating current input signal on the DC bus. In some embodiments of FIG. 1A and FIG. 1B, a stimulus signal is, in effect, applied in parallel across the terminals of the first capacitance 12 or the second capacitance 112, or stimulus signals are applied in parallel across the terminals of both the first capacitance 12 and the second capacitance 112 to excite potential oscillation or resonance of the LC or RLC combination (e.g., parallel LC or parallel RLC combination), which can be damped by the appropriate selection of a (discrete) damping resistor (e.g., 16, 116).

In the positive path 203, the first RL network 202 may be configured as a (first) power path with a first inductance 18 (Lp1) (at a higher inductance than the second inductance 21 (Lf1)) and a first resistance 14 (Rp1) (at a lower resistance than the second resistance 16 (Rf1). In certain embodiments within the first RL network 202, some low frequency currents of AC noise/ripple are tolerated and can flow through the first power path without resulting in any damaging resonance based on frequency range of the stimulus signal, where the low frequency currents are lower than the frequency range of the stimulus signal and/or the potential resonance frequency (e.g., at maximum impedance for a parallel LC or RLC circuit or at a frequency where the inductive reactance substantially equals the capacitive reactance for a corresponding LC or RLC circuit in the positive path 203).

In the positive path 203, the second RL network 204 may be configured as a (first) damping path with a second inductance 21 (Lf1) (at a lower inductance than the first inductance 18 (Lp1) and a second resistance 16 (Rf1) (at higher resistance than the first resistance 14 (Rp1)). The damping resistance or damping resistor (e.g., second resistance 16 (Rf1)) is selected based on a target resonant frequency that is withing a range of the stimulus frequency of the stimulus signal, where the target resonant frequency may be estimated based on an estimated maximum impedance of the parallel inductance and capacitance or based on the (parallel) inductive reactance substantially equal to capacitive reactance.

In the negative path 205, the third RL network 206 may be configured as a (second) power path with a third inductance 118 (Lp2) (at a higher inductance than the fourth inductance 121 (Lf2) and a third resistance 114 (Rp2) (at a lower resistance than the fourth resistance 116 (Rf2)). In certain embodiments within the third RL network 206, the low frequency currents of AC noise/ripple are tolerated and can flow through the second power path without resulting in any damaging resonance based on the stimulus signal, where the low frequency currents are lower than the frequency range of the stimulus signal and/or or the potential resonance frequency (e.g., at maximum impedance for a parallel LC or RLC circuit or at a frequency where the inductive reactance substantially equals the capacitive reactance for a corresponding LC or RLC circuit in the positive path 203).

In the negative path 205, the fourth RL network 208 may be configured as a (second) damping path with a fourth inductance 121 (Lf2) (at a lower inductance than the third inductance 118 (Lp2)) and a fourth resistance 116 (Rf2) (at higher resistance than the third resistance 114 (Rp2)). The damping resistance or damping resistor is selected based on a target resonant frequency that is withing a range of the stimulus frequency of the stimulus signal, where the target resonant frequency may be estimated based on an estimated maximum impedance of the parallel inductance and capacitance or based on the inductive reactance substantially equal to capacitive reactance.

The damping device (111, 211) comprises one or more transformers (120, 209) in accordance with examples that may be applied separately or cumulatively. Under a first example, the windings of the first transformer 120 comprises a primary windings of the first inductance 18 (Lp1) and second windings of the third inductance 118 (Lp2) that are arranged (e.g., wound with a determined turn direction and ratio of turns between the primary and second windings) for mutual coupling between the positive path 203 and the negative path 205 to enhance respective currents between the windings (e.g., such that differential current in the positive and negative path 205 mutually enhances the coupled magnetic flux).

Under a second example, the windings of the first transformer 120 comprises a primary windings of the first inductance 18 (Lp1) and second windings of the third inductance 118 (Lp2) that are arranged (e.g., wound to reinforce AC signals or enhance AC signals) for mutual coupling via a first core, 212 such as an air core (e.g., for frequencies at or above approximately 1 MHz), or a ferrite core (e.g., for frequencies at or above approximately 100 KHz), or an iron core (e.g., laminated iron core for frequencies below 100 KHz). The iron core may comprise powdered iron or iron filler that is encapsulated or bonded in a cured resin, polymeric matric or plastic matrix. Further, to enhance AC signals the primary and secondary windings of the transformer 120 can be wound: (a) oppositely or in opposite directions if the AC signals in the positive path 203 and negative path 205 are out of phase or (b) in the same direction if the AC signals in the positive path 203 and the negative path 205 are in phase.

Under a third example, the windings of second transformer 209 comprise primary windings of the second inductance 21 (Lf1) and secondary windings of the fourth inductance 121 (Lf2) arranged for mutual coupling between the positive path 203 and the negative path 205 to cancel or oppose respective currents between the primary and secondary windings for mutual coupling. Further, to cancel or attenuate AC signals the primary and secondary windings can be wound: (a) oppositely or in opposite directions if the AC signals in the positive path 203 and negative path 205 are in phase or (b) in the same direction if the AC signals in the positive path 203 and the negative path 205 are out of phase.

Under a fourth example, the windings of the second transformer 209 comprises primary windings of the second inductance 21 (Lf1) and second windings of the fourth inductance 121 (Lf2) that are arranged for mutual coupling via a second core 22, such as an air core (e.g., for frequencies at or above approximately 1 MHz), or a ferrite core (e.g., for frequencies at or above approximately 100 KHz), or an iron core (e.g., laminated iron core for frequencies below 100 KHz). Further, to cancel or attenuate AC signals the primary and secondary windings can be wound: (a) oppositely or in opposite directions if the AC signals in the positive path 203 and negative path 205 are in phase or (b) in the same direction if the AC signals in the positive path 203 and the negative path 205 are out of phase.

Under a fifth example, the first transformer 120, or second transformer 209, or both comprise an air-wound transformer or coreless transformer that is configured to attenuate frequencies equal to or greater than approximately 10 KHz (e.g., plus or minus 10 percent).

Under a sixth example, the first transformer 120, or second transformer 209, or both comprises an iron core transformer or powdered iron core transformer that is configured to attenuate frequencies equal to or greater than 100 Hz. (e.g., plus or minus 10 percent).

The damping device (111, 211) may employ various configurations of RL networks, which may be applied separately or cumulatively. In accordance with a first configuration, a first RL network 202 has a first resistance 14 (Rp1) and first inductance 18 (Lp1) in series with each other and in parallel with the first capacitance 12, the second capacitance 112, or both, and the stimulus signal in parallel with one or both capacitors (12, 112). Similarly, the second RL network 204 has a second resistance 16 (Rf1) and a second inductance 21 (Lf1) in series with each other and in parallel with the first capacitance 12, the second capacitance 112, or both, and the stimulus signal in parallel with one or both capacitors (12, 112).

In accordance with a second configuration, the first resistive-inductive (RL) network 202 comprises a power path with a first resistance 14 (Rp1), whereas the second RL network 204 comprises a damping path to dampen potential parasitic resonance of alternating current signal components on the direct current bus 176 with a second resistance 16 (Rf1), wherein the first resistance 14 (Rp1) is less than the second resistance 16 (Rf1).

In accordance with a third configuration, the third resistive-inductive (RL) network 206 comprises a power path with a third resistance 114 (Rp2), whereas the fourth RL network 208 comprises a damping path with a fourth resistance 116 (Rf2), wherein the third resistance 114 (Rp2) is less than the fourth resistance 116 (Rf2).

In accordance with a fourth configuration, one or more of the first RL network 202, the second RL network 204, the third RL network 206, and the fourth RL network 208 comprise transmission line, insulated wires, braided conductors, coaxial cable, stripline, microstrip or twisted pair wires (e.g., shielded twisted pair wires). For example, a transmission line may comprise a stranded central conductor or solid central conductor that is coaxially surrounded by an annular dielectric region, which is covered by a conductive shield (e.g., of foil, braided conductors, or both); where the conductive shield is encapsulated by an exterior dielectric sheath. Further, discrete damping resistors (e.g., 16, 116), alone, or in combination with adjusting the resistance of a shield configuration (e.g., braided weave configuration of shield conductors) of the transmission line, can be added in series or parallel with the transmission line to dampen or reduce potential resonance associated with one or more stimulus signals. For instance, each one of the second RL network and the fourth RL network comprise transmission line, braided conductors, coaxial cable, stripline, microstrip or twisted pair wires that are coupled to a discrete damping resistor (e.g., firm 16, 116).

In accordance with the fifth configuration, the first transformer 120, the second transformer 209, or both comprise a transformer with the windings configured from insulated wire, transmission line, coaxial cable, stripline, microstrip, or twisted pair wires and wherein a core (22, 212) is composed of an iron powder or ferrite powder embedded in a polymer or plastic.

In accordance with a sixth configuration, one or more of the first RL network 202, the second RL network 204, the third RL network 206, and the fourth RL network 208 comprise transmission line, braided conductors, coaxial cable, stripline, microstrip or twisted pair wires (e.g., shielded twisted pair wires). For example, a transmission line may comprise a stranded central conductor or solid central conductor that is coaxially surrounded by an annular dielectric region, which is covered by a conductive shield (e.g., of foil, braided conductors, or both), where the conductive shield is encapsulated by a dielectric sheath. Further, discrete inductors can be added in series or parallel with the transmission line (e.g., adding discrete inductors and/or winding inductance of transformer(s) (120, 209) to first inductance 18 (Lp1) and/or third inductance 118 (Lp2)) to shift the resonant frequency or reduce potential resonance associated with one or more stimulus signals.

Although FIG. 1A and FIG. 1B illustrate two electronic devices (144, 146) coupled in parallel to a DC bus, it is understood that additional electronic devices could be coupled in parallel to the same DC bus at connection nodes with respective heat sinking (e.g., a connectors that are mounted on finned (metal, glass, or ceramic) heat sinks) for thermal dissipation.

Alternately, three or more electronic devices (e.g., comprising devices, 144, 146) can be connected as a star network to a DC bus, where a set of three or more branches with one terminal (e.g., positive terminal) of each are connected to a common node (e.g., positive polarity node) with respective heat sinking (e.g., a connectors that are mounted on finned (metal, glass, or ceramic) heat sinks) for thermal dissipation. Meanwhile, in some configurations, the negative terminals of each electronic device (e.g., comprising 144, 146) can be coupled, directly or indirectly, to neutral or a common neutral node (e.g., chassis ground or electrical ground).

Figure 2:
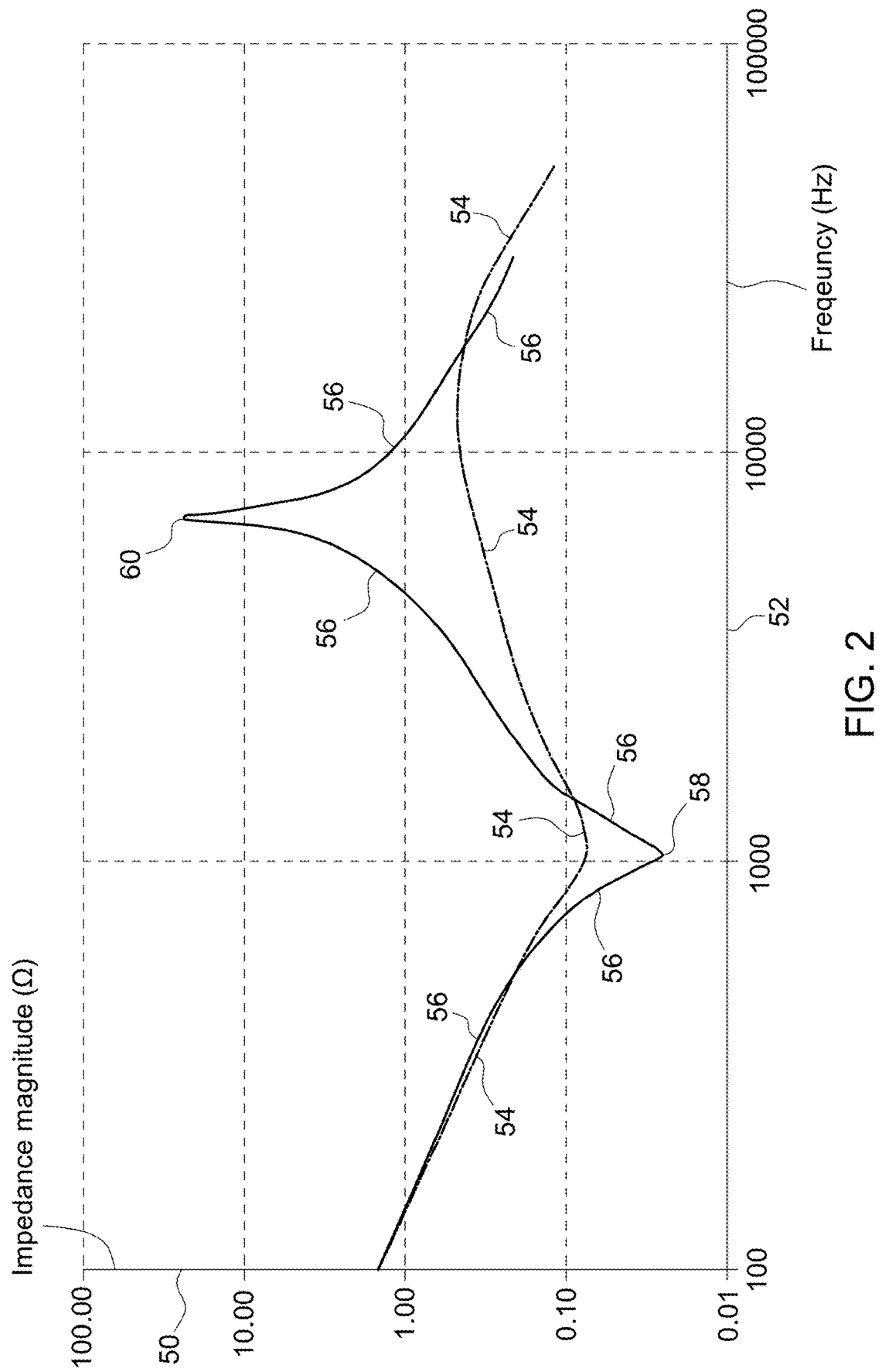
FIG. 2 is an illustrative impedance versus frequency graph without the electrical damping device coupled to the DC voltage bus and with the electrical damping device coupled to the DC voltage bus.
Figure 3:
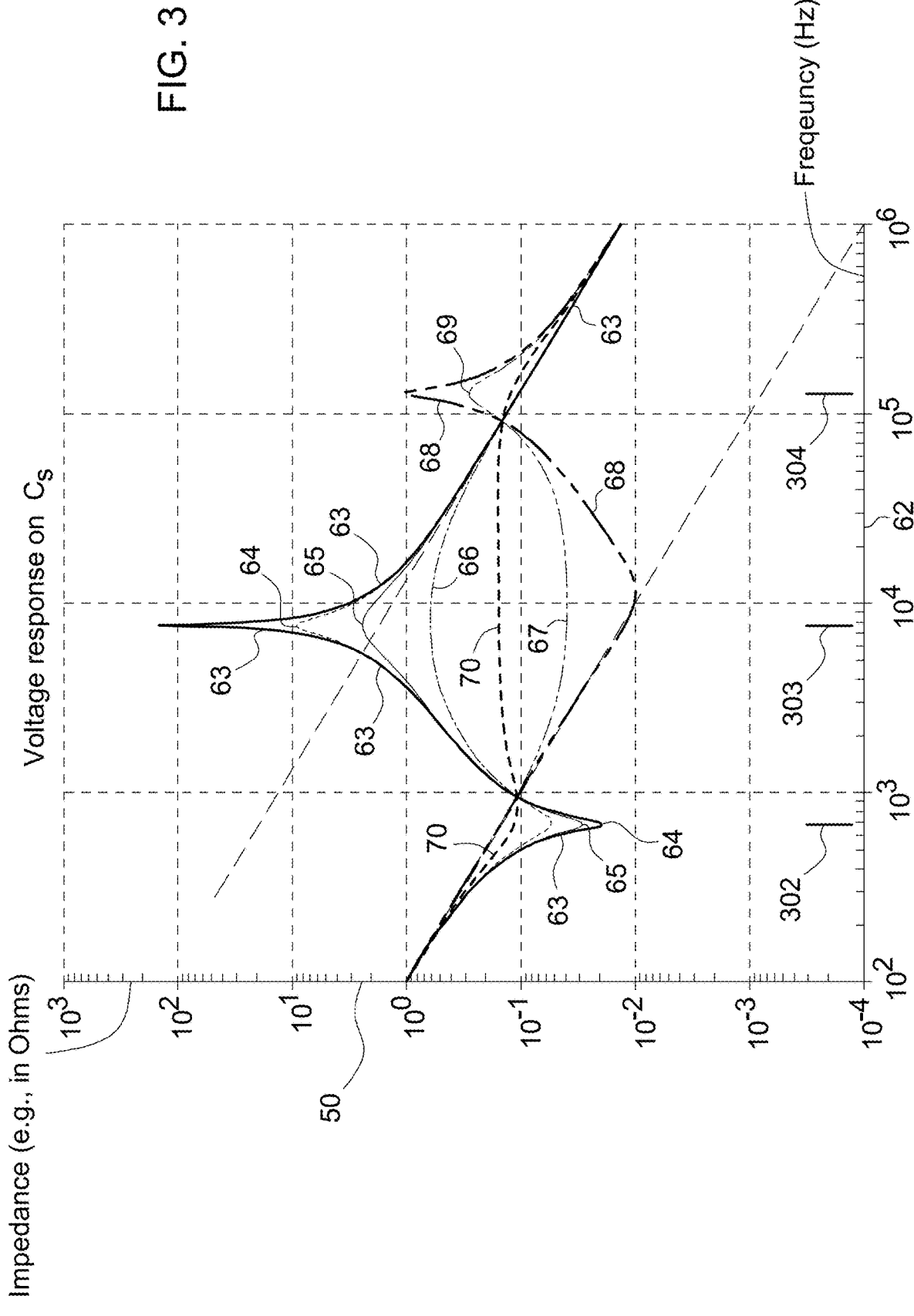
FIG. 3 is an illustrative impedance versus frequency graph with different levels of resistances in the electrical damping device that is coupled to the DC voltage bus.

As illustrated in FIG. 2 and FIG. 3, impedance magnitude component 50 of the impedance magnitude versus frequency 52 response of the DC voltage bus 176 is smoothed or attenuated via one or more damping resistors (e.g., 16, 116) to suppress magnitude spikes associated with parasitic oscillation or resonance of the first capacitance 12, the second capacitance 112 and one more of the inductances associated with the DC voltage bus 176.

FIG. 2 illustrates a first curve 56 of impedance magnitude versus frequency graph without the electrical damping device (111, 211) or suitable damping resistors (e.g., 16, 116) coupled to the DC voltage bus 176 and a second curve 54 with the electrical damping device (111, 211) or suitable damping resistors (e.g., 16, 116) coupled to the DC voltage bus 176. The impedance magnitude 50, which can be expressed in units of Ohms, is illustrated on the vertical axis, whereas the frequency, which can be expressed in units of Hertz, is illustrated on the horizontal axis.

A first curve 56 (e.g., undamped curve) of impedance magnitude versus frequency has a deficient damping resistance (e.g., 16, 116 is set or adjusted to resistance value that is too low): (1) where a deficient damping resistance means resistance values in the applicable resonant circuit are too low for a series resonant circuit or too high for a parallel resonant circuit (e.g., at or above a threshold parallel resistance) for damping the resonant circuits of FIG. 2, such as if the second resistance 16 (Rf1) and fourth resistance 116 (Rf2) are considered or modeled as damping resistances that are part of one or more resonant circuits; (2) where a deficient damping resistance means resistance values in the applicable resonant circuit are too low for damping when the resonant circuits of FIG. 2, such as if the second resistance 16 (Rf1) and fourth resistance 116 (Rf2) are considered or modeled as damping resistances that are part of one or more parallel resonant circuits, or as equivalent series resonant circuits.

In one embodiment, in FIG. 2 in the first curve 56 (e.g., undamped curve), a high relative impedance (and corresponding low line AC current on the DC bus) of a parallel resonant circuit is indicated by the (resonant) peak 60 or node as a potential resonant frequency or potential resonant frequency range (e.g., about 7500 Hertz).

In contrast, in the second curve 54 (e.g., damped curve), the damping resistances are adequate or sufficient, such as resistance values for the second resistance 16 (Rf1) and fourth resistance 116 (Rf2): (a) that equal or are less than a threshold (parallel resistance) for damping of the second resistance 16 (Rf1) and fourth resistance 116 (Rf2) are modeled as part of parallel resonant circuits (e.g., parallel LC or parallel RLC), and/or (b) that meet or exceed a threshold (series resistance) for damping of the second resistance 16 (Rf1) and fourth resistance 116 (Rf2) are modeled as part of (equivalent) series resonant circuits (e.g., equivalent series LC or series RLC) to the respective parallel resonant circuit. It is possible that the minimum threshold series resistance for damping is less than the corresponding minimum threshold parallel resistance for damping equivalent circuits.

Accordingly, in the second curve 54, there is no peak or node that corresponds to peak 60 in the first curve 56. Rather, peak 60 has no equivalent in the second (damped) curve 54 within a potential resonant frequency or potential resonant frequency range (e.g., about 7500 Hz). In FIG. 2 at the peak 60 or node, the parallel resonant circuit (e.g., parallel RLC) aspects predominate in the first curve 56, whereas the second curve 54 has a damped impedance magnitude versus frequency response that does not support resonance at or around the potential resonant frequency range (e.g., about 7500 Hz). In one embodiment, high relative impedance (and corresponding low line AC current on the DC voltage bus 176) of a potentially parallel resonant circuit is indicated by the peak 60 or node at a potential resonant frequency or potential resonant frequency range (e.g., about 7500 Hertz); such peak 60 is damped by damping resistors (e.g., 16, 116) and; hence, eliminated in the second curve 54.

Further, the first curve 56 has a low impedance node 58 within another potentially resonant frequency range (e.g., about 1000 Hz). For example, at or around the frequency range of the low impedance node 58, the inductance (or inductance plus resistance) of a parallel resonant circuit can sometimes dominate over the capacitance (e.g., of first capacitance 12, the second capacitance 112, or both). Further, at the low impedance node 58 the inductance can dominate at low frequencies below the resonance frequency range at peak 60, where the capacitive reactance is approximately equal to the inductance reactance or where the impedance magnitude has a peak value.

Alternatively or cumulatively, in the first curve 56 (e.g., undamped curve) the node 58, the equivalent series resonant circuit (e.g., series RLC or LC), of the modeled circuit, of positive path 203, or negative path 205, or both can produce a low impedance node 58 or notch that is commensurate with a dominant inductance.

At the low impedance node 58, a first curve 56 (e.g., undamped curve) of impedance magnitude versus frequency has a deficient damping resistance where a deficient damping resistance means resistance values in the applicable resonant circuit are too low (e.g., at or below a minimum threshold) for damping the resonant circuits of FIG. 2. Further, if the second resistance 16 (Rf1) and fourth resistance 116 (Rf2) are considered or modeled as damping resistances (e.g., that are part of one or more parallel resonant circuits, series resonant circuits, or equivalent series resonant circuits for the respective parallel resonant circuit), then the resistance values of the second resistance 16 (Rf1) and fourth resistance 116 (Rf2) are too low for proper damping around node 58 of the first curve 56. A second curve 54 has adequate damping resistance to eliminate the low impedance node 58 of the first curve 56 or to decrease a depth of the notch of the low impedance node 58. For example, for the second curve 54 the damping resistance, such as the second resistance 16 (Rf1) and fourth resistance 116 (Rf2), equals or is less than a threshold (parallel resistance) as the damping resistance if the damping resistance is modeled as part of a parallel resonant circuit, or its equivalent series resonant circuit.

Alternately or cumulatively, to address or decrease depth of the notch of the low impedance node 58, the resonance or damp the low impedance node, the value of the inductance (e.g., 18, 118) can be reduced, alone or together with changes to the value of the damping resistance, particularly where the parallel resonant circuit predominates or is selected as the applicable model.

In summary, a second curve 54 of impedance versus frequency meets or exceeds the requirements of a critical damping resistance that prevents resonance or fluctuation of the current versus time of an alternating current component on the DC voltage bus 176. In the second curve 54, the resonance a nodes 58 and 60 are almost entirely eliminated or materially reduced.

FIG. 3 illustrates impedance magnitude 50 versus frequency 52 graph with different levels of damping resistances in the electrical damping device (111, 211) that is coupled to the DC voltage bus 176. The impedance magnitude 50, which can be expressed in units of Ohms, is illustrated on the vertical axis, whereas the frequency 62, which can be expressed in units of Hertz, is illustrated on the horizontal axis. The impedance magnitude can be estimated by actual or simulated measurements of voltage and current at the first capacitance 12, the second capacitance 112 or both. For a parallel RLC or LC circuit, there can be multiple potentially resonant frequencies, such as a central resonant frequency or primary resonant frequency 303, that is flanked by a potential secondary resonant frequency 302, and a potential tertiary resonant frequency 304.

At the primary resonant frequency 303, the curve 63 with the greatest peak or greatest impedance magnitude (e.g., greatest central peak) has the greatest resistance/impedance for parallel LC or RLC circuit, which must be adjusted (e.g., lowered with a lower parallel damping resistance) to reduce, eliminate or flatten the central peak around the primary resonant frequency 303. Further, at the secondary resonant frequency 302, curve 63 has a locally low impedance node (e.g., secondary resonance) at a lower frequency. Meanwhile, at tertiary resonant frequency 304, the curve 63 has a high impedance node (e.g., tertiary resonance) at a local high impedance node.

At the secondary resonant frequency 302, the potential secondary resonances of curves (63, 64, 65, 66) at the lower frequency node is dominated by the inductive components of the LC or RLC in the positive path 203 or the negative path 205 of the damping device (111, 211). As the damping resistance (16, 116) is progressively increased: from curve 63 or curve 64 to curve 65, or from curve 65 to curve 66, or from curve 66 to curve 70, at the secondary resonant frequency 302 the lower frequency node is reduced or eliminated.

Meanwhile, at the tertiary resonant frequency 305, a potential tertiary resonance at the higher frequency node is dominated by capacitive components of the LC or RLC in the positive path 203 or negative path 205 of the damping device (111, 211). As the damping resistance (16, 116) is progressively increased, curves 68 and 69 transition to curve 70 in which the potential tertiary resonance is reduced or eliminated.

For the curves in FIG. 3, the parallel resistance (e.g., 16, 116) is the greatest for curve 63 at the undamped central peak at the primary resonant frequency 303, where reactive inductance and reactive capacitance tend to cancel out. In comparison to curve 63 the parallel resistance (e.g., 16, 116) is the second greatest for curve 64 at the undamped central peak at the primary resonant frequency 303, where reactive inductance and reactive capacitance tend to cancel out. With respect to curve 63 and curve 64, the parallel resistance (e.g., 16, 116) is the third greatest for curve 65 at the undamped central peak at the primary resonant frequency 303, where reactive inductance and reactive capacitance tend to cancel out. In comparison to curve 63 and curve 64 and curve 65, the parallel resistance (e.g., 16, 116) is the fourth greatest for curve 66 at the undamped central peak at the primary resonant frequency 303, where reactive inductance and reactive capacitance tend to cancel out. With respect to curve 63, curve 64, curve 65, and curve 66, the parallel resistance (e.g., 16, 116) is the fifth greatest for curve 70 at the undamped central peak at the primary resonant frequency 303, where reactive inductance and reactive capacitance tend to cancel out. With respect to curve 63, curve 64, curve 65, and 66, and curve 70, the parallel resistance (e.g., 16, 116) is the sixth greatest for curve 67 at the undamped central peak at the primary resonant frequency 303, where reactive inductance and reactive capacitance tend to cancel out. With respect to curve 63, curve 64, curve 65, and 66, curve 70, and curve 68, the parallel resistance (e.g., 16, 116) is the lowest for curve 67 at the undamped central peak at the primary resonant frequency 303, where reactive inductance and reactive capacitance tend to cancel out. Accordingly, if the damping resistance is at or below a threshold (parallel resistance), the potentially parallel resonant circuit can be damped, as illustrated in curve 70, as possibly in curves 66 and 67 where the resonance is significantly detuned over a wide bandwidth.

In some embodiments, the electrical damping device may have a transfer function (e.g., in the s-domain or z transform) that defines the impedance versus frequency response illustrated in FIG. 2 or FIG. 3, for example.

Although certain embodiments of an electrical damping device have been described in this disclosure, the scope of the coverage of this disclosure may extend to variants of the electrical damping device, systems, methods, processes, examples, systems and concepts disclosed herein. For example, in any patent that may be granted on this disclosure, one or more claims can cover equivalents and variants to the full extent permitted under applicable law, among other things The following is claimed:

1. An electrical damping device for reducing resonance for devices that are coupled to a direct current (DC) voltage bus, the DC voltage bus comprising a first set of DC ports and a second set of DC ports, the first set of DC ports having a first capacitance in parallel with a positive terminal and a negative terminal of the DC ports, the second set of DC ports having a second capacitance in parallel with the DC ports with a positive terminal and a negative terminal of the DC ports; wherein the electrical damping device comprises:

a positive path comprising a first resistive-inductive (RL) network in parallel with a second RL network, wherein the positive path is coupled between the positive terminals of the DC ports;

a negative path comprising a third RL network in parallel with a fourth RL network, wherein the negative path is coupled between the negative terminals of the DC ports;

a first transformer defined by a first inductance of first RL network and a third inductance of the third RL network, wherein the first transformer comprises windings arranged for mutual coupling between the positive path and the negative path; and a second transformer defined by a second inductance of the second RL network and a fourth inductance of the fourth RL network, wherein the second transformer comprises windings arranged for mutual coupling between the positive path and the negative path;

wherein the third RL network comprises a power path with a third resistance, whereas the fourth RL network comprises a damping path with a fourth resistance, wherein the third resistance is less than the fourth resistance.

2. The device according to claim 1 wherein the first RL network has a first resistance, wherein the second RL network has a second resistance; wherein the first inductance is greater than the second inductance; and wherein the first resistance is lower than the second resistance, where the second resistance is configured to attenuate a resonant magnitude of a combination of the first capacitance, the first inductance, and the second capacitance.

3. The device according to claim 1 wherein the third inductance is greater than the fourth inductance, where the fourth resistance is configured to attenuate a resonant magnitude of a combination of the first capacitance, the third inductance, and the second capacitance.

4. The device according to claim 1 wherein the first RL network has the first resistance and the first inductance in series with each other; wherein the second RL network has the second resistance and the second inductance.

5. The device according to claim 1 wherein the windings of the first transformer comprises a primary windings of the first inductance and secondary windings of the third inductance that are arranged for mutual coupling between the positive path and the negative path to enhance respective currents between the windings.

6. The device according to claim 1 wherein the windings of second transformer comprise primary windings of the second inductance and secondary windings of the fourth inductance arranged for mutual coupling between the positive path and the negative path to cancel or oppose respective currents between the windings.

7. The device according to claim 1 wherein first resistive-inductive (RL) network comprises a power path with a first resistance, whereas the second RL network comprises a damping path to dampen potential parasitic resonance of alternating current signal components on the direct current bus with a the second resistance, wherein the first resistance is less than the second resistance.

8. An electrical damping device for reducing resonance for devices that are coupled to a direct current (DC) voltage bus, the DC voltage bus comprising a first set of DC ports and a second set of DC ports, the first set of DC ports having a first capacitance in parallel with a positive terminal and a negative terminal of the DC ports, the second set of DC ports having a second capacitance in parallel with the DC ports with a positive terminal and a negative terminal of the DC ports; wherein the electrical damping device comprises:

a positive path comprising a first resistive-inductive (RL) network in parallel with a second RL network, wherein the positive path is coupled between the positive terminals of the DC ports;

a negative path comprising a third RL network in parallel with a fourth RL network, wherein the negative path is coupled between the negative terminals of the DC ports;

a first transformer defined by a first inductance of first RL network and a third inductance of the third RL network, wherein the first transformer comprises windings arranged for mutual coupling between the positive path and the negative path; and a second transformer defined by a second inductance of the second RL network and a fourth inductance of the fourth RL network, wherein the second transformer comprises windings arranged for mutual coupling between the positive path and the negative path;

wherein first transformer comprises an air-wound transformer or coreless transformer that is configured to attenuate frequencies equal to or greater than approximately 10 KHz.

9. An electrical damping device for reducing resonance for devices that are coupled to a direct current (DC) voltage bus, the DC voltage bus comprising a first set of DC ports and a second set of DC ports, the first set of DC ports having a first capacitance in parallel with a positive terminal and a negative terminal of the DC ports, the second set of DC ports having a second capacitance in parallel with the DC ports with a positive terminal and a negative terminal of the DC ports; wherein the electrical damping device comprises:

a positive path comprising a first resistive-inductive (RL) network in parallel with a second RL network, wherein the positive path is coupled between the positive terminals of the DC ports;

a negative path comprising a third RL network in parallel with a fourth RL network, wherein the negative path is coupled between the negative terminals of the DC ports;

a first transformer defined by a first inductance of first RL network and a third inductance of the third RL network, wherein the first transformer comprises windings arranged for mutual coupling between the positive path and the negative path; and a second transformer defined by a second inductance of the second RL network and a fourth inductance of the fourth RL network, wherein the second transformer comprises windings arranged for mutual coupling between the positive path and the negative path;

wherein the first transformer comprises an iron core transformer or powdered iron core transformer that is configured to attenuate frequencies equal to or greater than 100 Hz.

10. The device according to claim 1 wherein each one of the second RL network and the fourth RL network comprise transmission line, braided conductors, coaxial cable, stripline, microstrip or twisted pair wires that are coupled to a discrete damping resistor.

11. The device according to claim 1 wherein the second transformer comprises a transformer with the windings configured from insulated wires, transmission line, coaxial cable, stripline, microstrip, or twisted pair wires and wherein a core is composed of an iron powder or ferrite powder embedded in a polymer or plastic.

12. The device according to claim 1 wherein the magnitude component of the magnitude versus frequency response of the DC bus is smoothed or attenuated via one or more damping resistors to suppress magnitude spikes associated with parasitic oscillation or resonance of the first capacitance, the second capacitance and one more of the inductances associated with the DC bus.

13. The device according to claim 8 wherein the windings of the first transformer comprises a primary windings of the first inductance and secondary second windings of the third inductance that are arranged for mutual coupling between the positive path and the negative path to enhance respective currents between the windings.

14. The device according to claim 13 wherein the windings of second transformer comprise primary windings of the second inductance and secondary windings of the fourth inductance arranged for mutual coupling between the positive path and the negative path to cancel or oppose respective currents between the windings.

15. The device according to claim 8 wherein the magnitude component of the magnitude versus frequency response of the DC bus is smoothed or attenuated via one or more damping resistors to suppress magnitude spikes associated with parasitic oscillation or resonance of the first capacitance, the second capacitance and one more of the inductances associated with the DC bus.

16. The device according to claim 8 wherein the second transformer comprises a transformer with the windings configured from insulated wires, transmission line, coaxial cable, stripline, microstrip, or twisted pair wires and wherein a core is composed of an iron powder or ferrite powder embedded in a polymer or plastic.

17. The device according to claim 9 wherein the windings of the first transformer comprises a primary windings of the first inductance and secondary second windings of the third inductance that are arranged for mutual coupling between the positive path and the negative path to enhance respective currents between the windings.

18. The device according to claim 17 wherein the windings of second transformer comprise primary windings of the second inductance and secondary windings of the fourth inductance arranged for mutual coupling between the positive path and the negative path to cancel or oppose respective currents between the windings.

19. The device according to claim 9 wherein the magnitude component of the magnitude versus frequency response of the DC bus is smoothed or attenuated via one or more damping resistors to suppress magnitude spikes associated with parasitic oscillation or resonance of the first capacitance, the second capacitance and one more of the inductances associated with the DC bus.

20. The device according to claim 9 wherein the second transformer comprises a transformer with the windings configured from insulated wires, transmission line, coaxial cable, stripline, microstrip, or twisted pair wires and wherein a core is composed of an iron powder or ferrite powder embedded in a polymer or plastic.

* * * * *